US011211655B2

United States Patent
Miller et al.

(10) Patent No.: US 11,211,655 B2
(45) Date of Patent: Dec. 28, 2021

(54) VEHICLE ENCLOSURE FOR PREVENTING ACCESS TO HIGH VOLTAGE COMPONENTS

(71) Applicant: FORD GLOBAL TECHNOLOGIES, LLC, Dearborn, MI (US)

(72) Inventors: Daniel Miller, Dearborn, MI (US); Dave Moschet, Dearborn, MI (US); Anil Reddy Pullalarevu, Northville, MI (US); Saravanan Paramasivam, South Lyon, MI (US); Louis Paspal, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 855 days.

(21) Appl. No.: 14/674,432

(22) Filed: Mar. 31, 2015

(65) Prior Publication Data

US 2016/0293914 A1    Oct. 6, 2016

(51) Int. Cl.
*H01M 50/20* (2021.01)

(52) U.S. Cl.
CPC ........ *H01M 50/20* (2021.01); *H01M 2220/20* (2013.01)

(58) Field of Classification Search
CPC .. H01M 2/0237; H01M 2/024; H01M 2/0242; H01M 2/0245; H01M 2/0434; H01M 2/1072; H01M 2/1077; H01M 2/0473; H01M 2/043; H01M 2/04; H01M 2220/20; H01M 50/20; Y02E 60/10
See application file for complete search history.

(56) References Cited

U.S. PATENT DOCUMENTS

| | | | |
|---|---|---|---|
| 6,242,130 B1* | 6/2001 | Noh | H01M 2/021 429/175 |
| 7,995,355 B2 | 8/2011 | Cochrane | |
| 2008/0057393 A1* | 3/2008 | Onuki | H01M 2/1022 429/159 |
| 2009/0166116 A1* | 7/2009 | Kiya | B60K 1/04 180/68.5 |
| 2010/0273034 A1* | 10/2010 | Hermann | H01M 2/08 429/62 |
| 2011/0272895 A1 | 11/2011 | Kritzer et al. | |
| 2012/0164500 A1 | 6/2012 | Loo et al. | |

(Continued)

FOREIGN PATENT DOCUMENTS

| | | |
|---|---|---|
| CN | 102484231 A | 5/2012 |
| JP | 2011194982 A | 10/2011 |

(Continued)

OTHER PUBLICATIONS

"Stamping, aka Pressing", American Steel Products Company, Mar. 15, 2017. (Year: 2017).*

*Primary Examiner* — Miriam Stagg
*Assistant Examiner* — Lilia Nedialkova
(74) *Attorney, Agent, or Firm* — David B. Kelley; Carlson, Gaskey & Olds (57) ABSTRACT

A vehicle assembly according to an exemplary aspect of the present disclosure includes, among other things, an enclosure, a high voltage component housed inside the enclosure and a blocking member configured to restrict access to the high voltage component along a path that extends through the enclosure.

7 Claims, 5 Drawing Sheets

(56) References Cited

U.S. PATENT DOCUMENTS

| | | | |
|---|---|---|---|
| 2012/0164504 A1* | 6/2012 | Takashina | B60K 6/48 |
| | | | 429/99 |
| 2012/0251863 A1 | 10/2012 | Berger et al. | |
| 2013/0209857 A1* | 8/2013 | Lev | H01M 2/1077 |
| | | | 429/120 |
| 2013/0280577 A1* | 10/2013 | Shin | H01M 2/0277 |
| | | | 429/120 |
| 2013/0301233 A1* | 11/2013 | Durfee | H01M 2/1077 |
| | | | 361/807 |
| 2014/0284125 A1* | 9/2014 | Katayama | B60K 1/04 |
| | | | 180/68.5 |
| 2015/0171479 A1* | 6/2015 | Fujita | H01M 10/12 |
| | | | 429/175 |
| 2015/0207119 A1* | 7/2015 | Onodera | H01M 2/1077 |
| | | | 429/89 |

FOREIGN PATENT DOCUMENTS

| | | | | |
|---|---|---|---|---|
| JP | 2014022154 A | 2/2014 | | |
| JP | WO 2014041970 A1 * | 3/2014 | | H01M 2/1077 |

* cited by examiner

VEHICLE ENCLOSURE FOR PREVENTING ACCESS TO HIGH VOLTAGE COMPONENTS

TECHNICAL FIELD

This disclosure relates to a vehicle assembly for an electrified vehicle. The vehicle assembly includes a blocking member configured to impede access to high voltage components during servicing events.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on internal combustion engines to propel the vehicle.

Numerous assemblies are employed to house components of electrified vehicles. One example of such an assembly is the battery assembly, which houses a plurality of battery cells that power electric machines and other electric loads of the electrified vehicle. Seals are disposed within the battery assembly to restrict moisture ingress into its interior. The seals may need to be removed from time to time to service the internal components of the battery assembly. Removal is typically achieved by cutting the seal using a cutting tool.

SUMMARY

A vehicle assembly according to an exemplary aspect of the present disclosure includes, among other things, an enclosure, a high voltage component housed inside the enclosure and a blocking member configured to restrict access to the high voltage component along a path that extends through the enclosure.

In a further non-limiting embodiment of the foregoing assembly, the enclosure includes a tray and a cover secured to the tray.

In a further non-limiting embodiment of either of the foregoing assemblies, the blocking member is formed in the tray.

In a further non-limiting embodiment of any of the foregoing assemblies, the blocking member is formed in the cover.

In a further non-limiting embodiment of any of the foregoing assemblies, the blocking member is formed in both the tray and the cover.

In a further non-limiting embodiment of any of the foregoing assemblies, the blocking member includes a block body disposed between the cover and the tray.

In a further non-limiting embodiment of any of the foregoing assemblies, the blocking member includes an interrupted surface formed in at least one of the tray and the cover.

In a further non-limiting embodiment of any of the foregoing assemblies, the interrupted surface is formed in the tray and extends toward the cover.

In a further non-limiting embodiment of any of the foregoing assemblies, the interrupted surface is formed in the cover and extends toward the tray.

In a further non-limiting embodiment of any of the foregoing assemblies, the blocking member is a stamped feature of the enclosure.

In a further non-limiting embodiment of any of the foregoing assemblies, a seal is disposed between a cover and a tray of the enclosure.

In a further non-limiting embodiment of any of the foregoing assemblies, the blocking member includes an interrupted surface formed in the enclosure, the interrupted surface blocking the path through the enclosure.

In a further non-limiting embodiment of any of the foregoing assemblies, the blocking member is formed in a flange of the enclosure.

In a further non-limiting embodiment of any of the foregoing assemblies, the blocking member establishes either a lip or a groove around a perimeter of the enclosure.

In a further non-limiting embodiment of any of the foregoing assemblies, the vehicle assembly is a high voltage battery assembly.

A method according to another exemplary aspect of the present disclosure includes, among other things, incorporating a blocking member into an enclosure of a vehicle assembly and impeding access through the enclosure to an interior of the enclosure via the blocking member.

In a further non-limiting embodiment of the foregoing methods, the incorporating step includes forming an interrupted surface in the enclosure.

In a further non-limiting embodiment of either of the foregoing methods, the interrupted surface is a stamped feature of the enclosure.

In a further non-limiting embodiment of any of the foregoing methods, the impeding step includes preventing insertion of a cutting tool into the interior of the enclosure such that the cutting tool is prevented from contacting a high voltage component housed inside the enclosure.

In a further non-limiting embodiment of any of the foregoing methods, the incorporating step includes positioning a block body between a cover and a tray of the enclosure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This discourse details a vehicle assembly for an electrified vehicle. The vehicle assembly includes an enclosure and one or more high voltage components housed inside the enclosure. The enclosure includes a blocking member configured to impede access to the high voltage components, such as during servicing events that require cutting through a seal to gain access to the enclosure interior. In some embodiments, the blocking member includes an interrupted surface formed in either a tray of the enclosure, a cover of the enclosure, or both. In other embodiments, the blocking member includes a block body disposed between opposing flanges of the tray and the cover. In still other embodiments, the blocking member establishes a clearance between the tray and the cover of the enclosure for receiving a seal. These and other features are discussed in greater detail in the following paragraphs of this detailed description.

Figure 1:
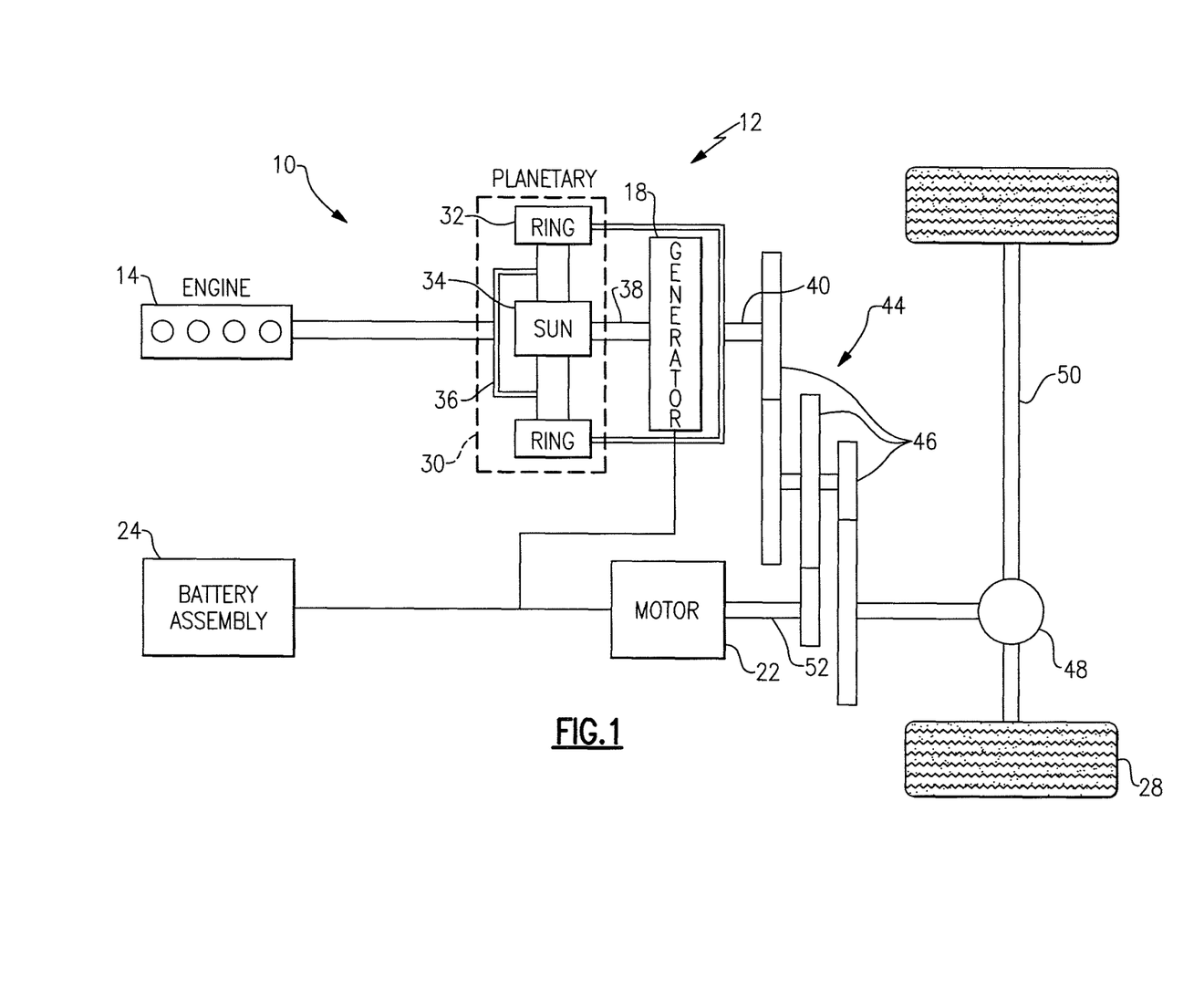
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's) and battery electric vehicles (BEV's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery. The battery assembly 24 may include a high voltage traction battery pack that includes a plurality of battery arrays, or groupings of battery cells, capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
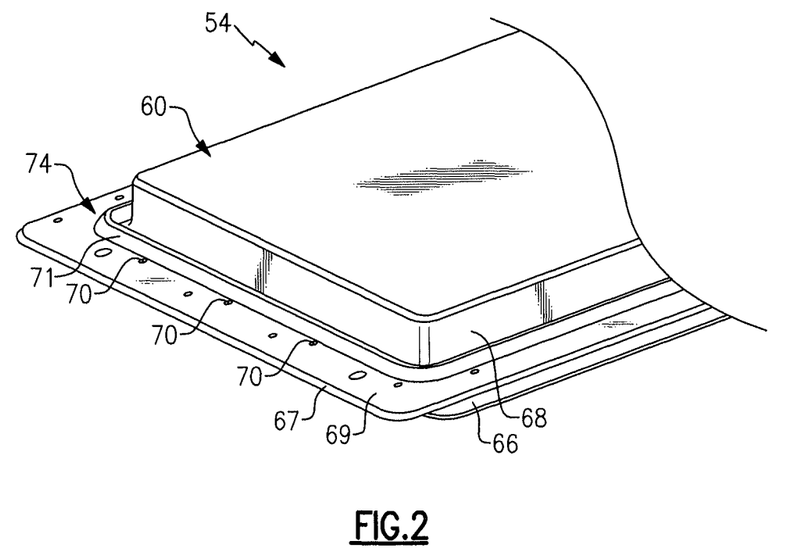
FIG. 2 illustrates portions of a vehicle assembly.
Figure 3:
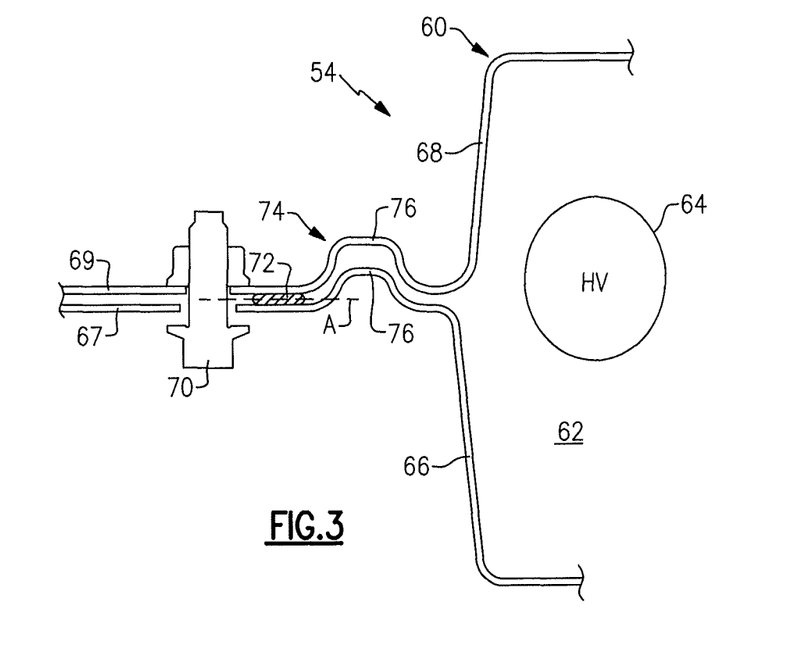
FIG. 3 is a cross-sectional view of the vehicle assembly of FIG. 2.

FIGS. 2 and 3 illustrate portions of a vehicle assembly 54 that can be incorporated into an electrified vehicle. For example, the vehicle assembly 54 could be employed within the electrified vehicle 12 of FIG. 1. The vehicle assembly 54 could be any assembly that requires sealing to restrict moisture ingress into its interior. In one non-limiting embodiment, the vehicle assembly 54 is a high voltage traction battery pack assembly for an electrified vehicle.

The vehicle assembly 54 includes an enclosure 60 that defines an interior 62 for housing one or more high voltage components 64 (shown schematically in FIG. 3). In one embodiment, the high voltage components 64 include battery cells. However, other high voltage components 64 may also be housed inside the enclosure 60.

The enclosure 60 may include any size, shape or configuration. That is, the enclosure 60 is not limited to the specific configuration shown in FIGS. 2 and 3. In one non-limiting embodiment, the enclosure includes a tray 66 and a cover 68. The cover 68 may be secured to the tray 66 using one or more fasteners 70. In one non-limiting embodiment, the tray 66 includes a flange 67 and the cover 68 includes an opposing flange 69 that extends in parallel with the flange 67. The fasteners 70 may be inserted through the opposing flanges 67, 69 to secure the cover 68 to the tray 66.

A seal 72 (see FIG. 3) may be disposed between the cover 68 and the tray 66 to prevent moisture from entering into the interior 62 between the cover 68 and the tray 66. In one embodiment, the seal 72 is a liquid seal that is applied between the opposing flanges 67, 69. The liquid sealant cures over time to form the seal 72. Non-limiting examples of suitable liquid seals include urethane seals and silicone seals.

The seal 72 may need to be removed to access the high voltage components 64 housed inside the enclosure 60, such as during servicing events. For example, one or more of the high voltage components 64 may need repaired or replaced over the life of the vehicle assembly 54. Removal of the seal 72 is typically achieved using a cutting tool that is configured to cut through the seal 72. The seal 72 is typically cut along an axis A that extends between the tray 66 and the cover 68 (see FIG. 3). It is desirable to avoid inadvertently contacting the high voltage components 64 with the cutting tool during this cutting process.

Accordingly, the enclosure 60 may include a blocking member 74 configured to impede access to the high voltage components 64 during removal of the seal 72. In one embodiment, the blocking member 74 includes one or more interrupted surfaces 76 that are formed in the tray 66, the cover 68, or both. In the exemplary embodiment of FIGS. 2 and 3, the interrupted surfaces 76 are formed in the opposing flanges 67, 69 of the tray 66 and the cover 68. For example, the interrupted surfaces 76 may be bent portions formed in the opposing flanges 67, 69 to establish a lip 71 (see FIG. 2) around a perimeter of the vehicle assembly 54. However, the interrupted surfaces 76 could be formed in other portions of the tray 66 and the cover 68. In another embodiment, the interrupted surfaces 76 extend in a different plane from the remaining portions of the opposing flanges 67, 69, as best shown in FIG. 3. In yet another embodiment, the interrupted surface 76 of the flange 67 extends toward the interrupted surface 76 of the flange 69, and the interrupted surface 76 of the flange 69 extends in a direction away from the interrupted surface 76 of the flange 67.

The interrupted surfaces 76 may be stamped features, cast features, injection molded features, or could be formed into the enclosure using any other known techniques. A cutting tool or other device that is moved along the axis A toward the interior 62 will be impeded from contacting the high voltage components 64 by one or more of the interrupted surfaces 76.

Figure 4:
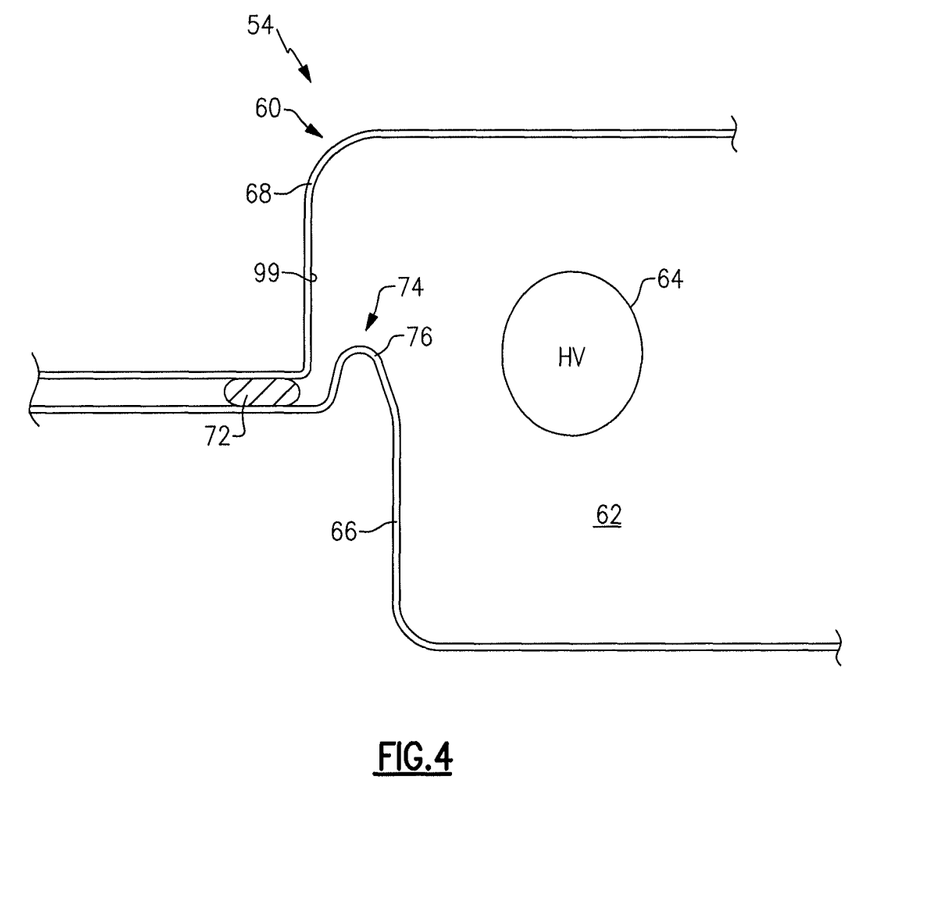
FIG. 4 illustrates a vehicle assembly according to another embodiment of this disclosure.

In an alternative embodiment, shown in FIG. 4, only the tray 66 is equipped with the blocking member 74. An interrupted surface 76 of the blocking member 74 is offset from an inner surface 99 of the cover 68 in a direction toward the interior 62, in this non-limiting embodiment. The interrupted surface 76 restricts access to the high voltage components 64 at a location between the cover 68 and the tray 66 of the enclosure 60.

Figure 5:
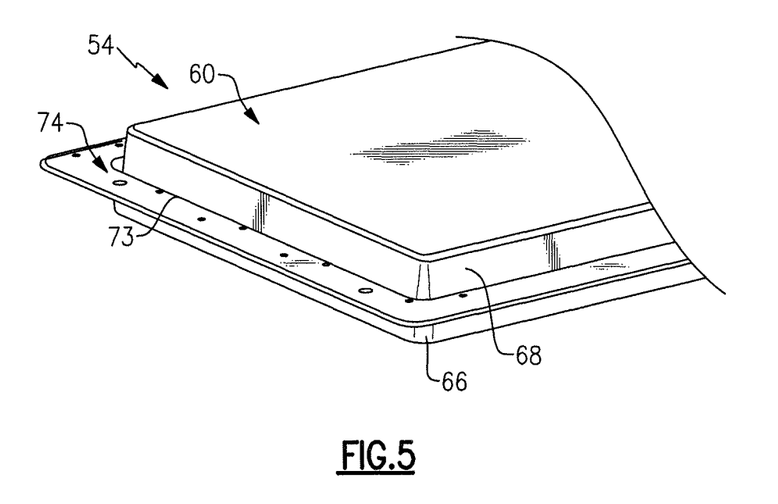
FIGS. 5 and 6 illustrate yet another vehicle assembly.
Figure 6:
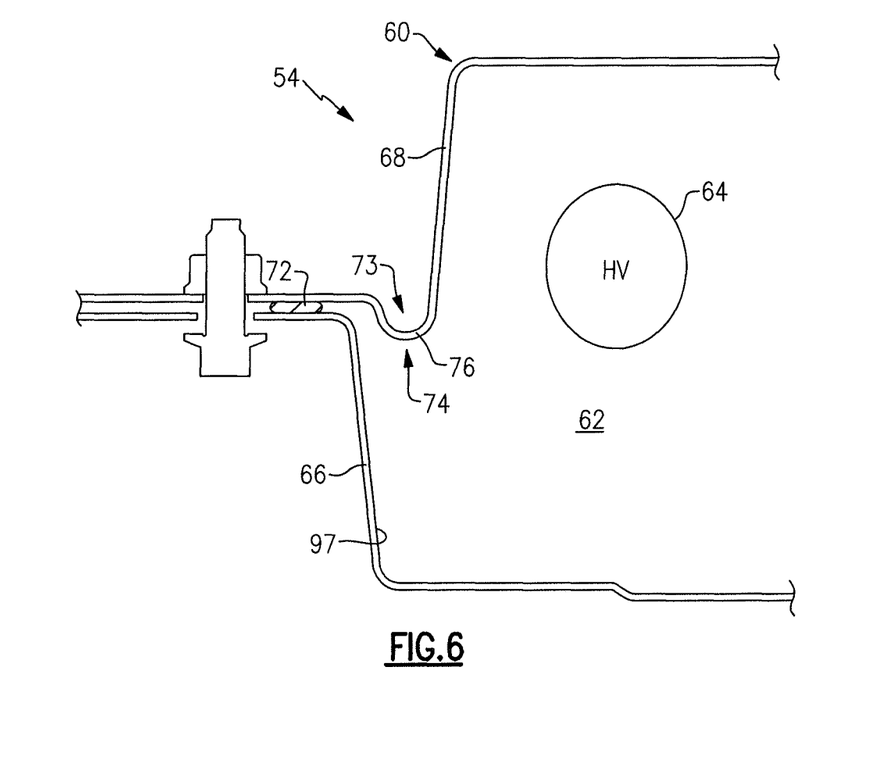

In yet another embodiment, shown in FIGS. 5 and 6, only the cover 68 is equipped with the blocking member 74. The blocking member 74 of the embodiment of FIGS. 5 and 6 includes an interrupted surface 76 formed in the cover 68 which establishes a groove 73 around a perimeter of the vehicle assembly 54. In one embodiment, the interrupted surface 76 of the blocking member 74 is offset from an inner surface 97 of the tray 66 in a direction toward the interior 62. The interrupted surface 76 restricts access to the high voltage components 62 at a location between the cover 68 and the tray 66 of the enclosure.

Figure 7:
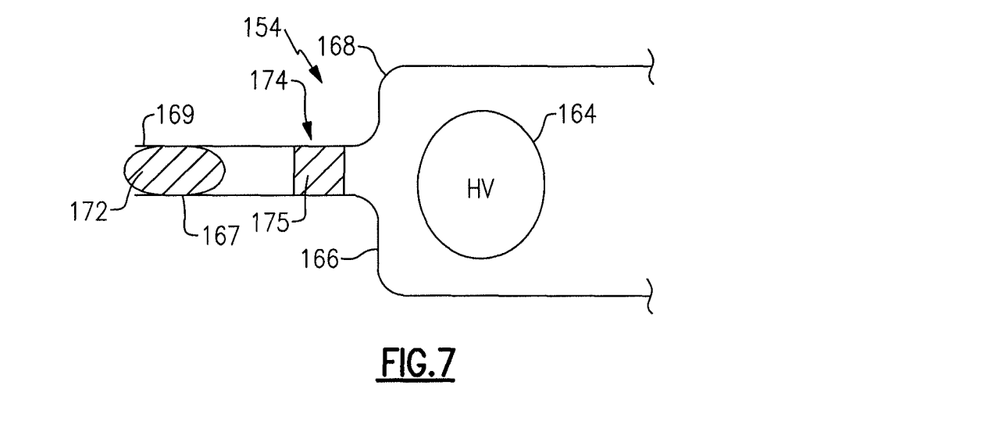
FIG. 7 illustrates a vehicle assembly according to yet another embodiment of this disclosure.

FIG. 7 illustrates another exemplary vehicle assembly 154. In this disclosure, like reference numbers designate like elements where appropriate and reference numerals with the addition of 100 or multiples thereof designate modified elements that are understood to incorporate the same features and benefits of the corresponding original elements.

In this embodiment, a blocking member 174 is disposed between a tray 166 and a cover 168 of the vehicle assembly 154. The blocking member 174 may include a block body 175, which is configured as a solid mass of material, positioned between a flange 167 of the tray 166 and another flange 169 of the cover 168. The block body 175 may be welded to the flanges 167, 169. The block body 175 impedes the insertion of cutting tools or other devices between the tray 166 and the cover 168 to prevent contact with high voltage components 164 housed inside the vehicle assembly 154 during the process of cutting the seal 172.

Figure 8:
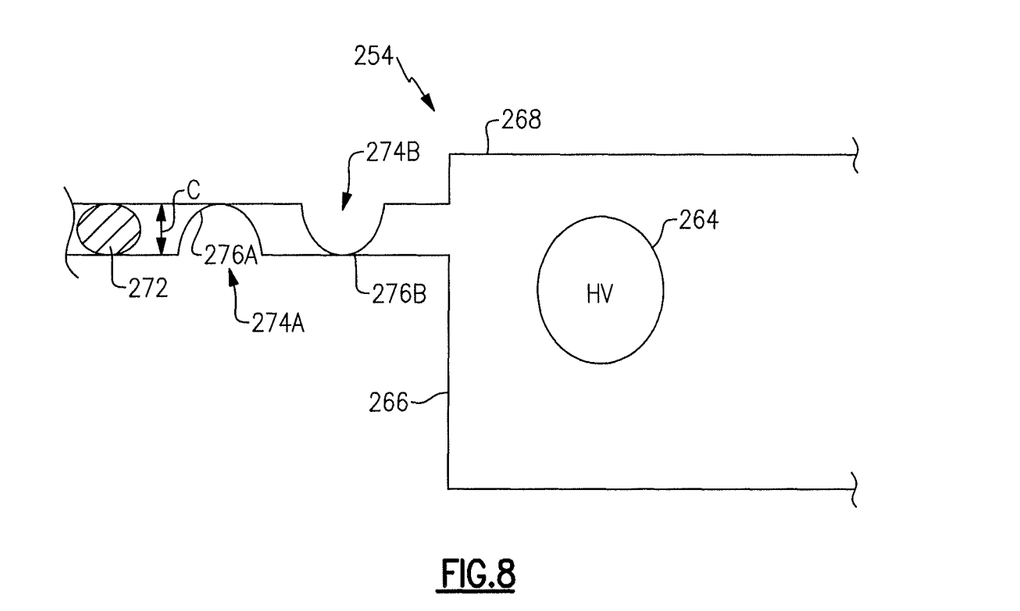
FIG. 8 illustrates yet another vehicle assembly.

FIG. 8 illustrates yet another exemplary vehicle assembly 254. The vehicle assembly 254 includes a tray 266 and a cover 268 secured to the tray 266 to house one or more high voltage components 264. In this embodiment, the tray 266 includes a first blocking member 274A and the cover 268 includes a second blocking member 274B. The first blocking member 274A may include a first interrupted surface 276A of the tray 266 that extends toward the cover 268. The second blocking member 274B may include a second interrupted surface 276B formed in the cover 268 and extending toward the tray 266. In one embodiment, the interrupted surfaces 276A, 276B are curved surfaces of the tray 266 and the cover 268.

The interrupted surfaces 276A, 276B establish a clearance C between the tray 266 and the cover 268 for receiving a seal 272. In other words, the interrupted surfaces 276A, 276B establish a height of the seal 272. In addition, the interrupted surfaces 276A, 276B may act as stop for the seal 272 and may impede access to the high voltage components 264 during cutting of the seal 272.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. A method, comprising:
incorporating a blocking member into an enclosure of a vehicle assembly, the blocking member including a first bent portion stamped in an exterior surface of a cover of the enclosure and a second bent portion stamped in an exterior surface of a tray of the enclosure; and
impeding access through the enclosure to an interior of the enclosure via the blocking member,
wherein the impeding includes preventing insertion of a cutting tool into the interior of the enclosure such that the cutting tool is prevented from contacting a battery component housed inside the enclosure.

2. The method as recited in claim 1, wherein the incorporating step includes forming an interrupted surface in the enclosure.

3. A battery pack, comprising:
- a cover including a first flange;
- a tray including a second flange;
- a seal disposed between the first flange and the second flange;
- a fastener extending through the first flange and the second flange to secure the cover to the tray; and
- a bent portion formed in an exposed, exterior surface of each of the first flange and the second flange,
- wherein the seal is located axially between the fastener and the bent portions of the first and second flanges.

4. The battery pack as recited in claim 3, wherein the seal is sandwiched between a first flat section of the first flange and a second flat section of the second flange.

5. The battery pack as recited in claim 4, comprising a first horizontal axis that extends between the first flat section and the second flat section and a second horizontal axis that extends between the bent portion of the first flange and the bent portion of the second flange, wherein the second horizontal axis is vertically offset from the first horizontal axis.

6. The battery pack as recited in claim 3, wherein the seal is axially offset from both the fastener and the bent portions.

7. The battery pack as recited in claim 3, wherein the bent portion of the second flange is received in a nested relationship with the bent portion of the first flange.

\* \* \* \* \*